United States Patent
Verheggen et al.

(10) Patent No.: US 10,698,110 B2
(45) Date of Patent: Jun. 30, 2020

(54) LASER SCANNING APPARATUS AND METHOD

(71) Applicant: Teledyne Optech Incorporated, Vaughan (CA)

(72) Inventors: Chris Verheggen, Scarborough (CA); Joe Liadsky, Willowdale (CA); Michael Sitar, Kitchener (CA); Daryl Hartsell, Toronto (CA)

(73) Assignee: TELEDYNE DIGITAL IMAGING, INC., Toronto, Ontario (CA)

( * ) Notice: Subject to any disclaimer, the term of this patent is extended or adjusted under 35 U.S.C. 154(b) by 1029 days.

(21) Appl. No.: 14/639,320

(22) Filed: Mar. 5, 2015

(65) Prior Publication Data
US 2016/0259058 A1  Sep. 8, 2016

(51) Int. Cl.
*G01S 17/89* (2020.01)
*G01S 17/10* (2020.01)
(Continued)

(52) U.S. Cl.
CPC ............ *G01S 17/89* (2013.01); *G01S 7/4808* (2013.01); *G01S 7/4817* (2013.01);
(Continued)

(58) Field of Classification Search
CPC ........ G01S 7/414; G01S 7/4818; G01S 7/484; G01S 7/4868; G01S 7/487; G01S 13/18;
(Continued)

(56) References Cited

U.S. PATENT DOCUMENTS

| 4,311,384 A | 1/1982 | Keene |
| 7,944,548 B2 | 5/2011 | Eaton |

(Continued)

FOREIGN PATENT DOCUMENTS

| CN | 1030333806 A | 4/2013 |
| EP | 1441236 A1 | 7/2004 |

(Continued)

OTHER PUBLICATIONS

International Search Report issued in related PCT/CA2016/050220 dated Jun. 7, 2016.
(Continued)

*Primary Examiner* — Luke D Ratcliffe
(74) *Attorney, Agent, or Firm* — McGuireWoods LLP

(57) ABSTRACT

The disclosed embodiments include an apparatus and method of using a laser to scan the ground or a target from an airborne or ground-based platform. In certain embodiments, the apparatus and method produces a 3-D elevation model of the terrain. In some embodiments, the apparatus includes a pulsed laser, a receiver to detect and amplify the pulse after being reflected by objects on the ground (or the ground itself), and electronics which measures the time of flight of the optical pulse from which the slant range to the target is calculated. Technical advantages of the disclosed embodiments include avoiding blind zones to ensure that no laser shots are wasted. In certain embodiments for airborne applications, the apparatus may also be configured to maintain a constant swath width or constant spot spacing independent of aircraft altitude or ground terrain elevation.

16 Claims, 5 Drawing Sheets

(51) Int. Cl.
*G01S 17/42* (2006.01)
*G01S 7/481* (2006.01)
*G01S 7/486* (2020.01)
*G01S 17/86* (2020.01)
*G01S 7/48* (2006.01)

(52) U.S. Cl.
CPC ............ *G01S 7/4868* (2013.01); *G01S 17/10* (2013.01); *G01S 17/42* (2013.01); *G01S 17/86* (2020.01)

(58) Field of Classification Search
CPC ...... G01S 13/22; G01S 17/026; G01S 17/933; G01S 7/4817; H01S 3/067; H01S 3/06754; H01S 3/06758; H01S 3/094007; H01S 3/094011; H01S 3/1608; H01S 3/1618
See application file for complete search history.

(56) References Cited

U.S. PATENT DOCUMENTS

| | | | |
|---|---|---|---|
| 8,493,445 B2 | 7/2013 | Degnan, III et al. | |
| 9,817,396 B1* | 11/2017 | Takayama | G05D 1/0038 |
| 2009/0185741 A1 | 7/2009 | Nahari et al. | |
| 2009/0262760 A1* | 10/2009 | Krupkin | G01S 7/414 372/6 |
| 2011/0051121 A1* | 3/2011 | Degnan, III | G01C 3/04 356/5.05 |
| 2016/0103210 A1* | 4/2016 | Ochimizu | G01S 17/89 356/5.01 |

FOREIGN PATENT DOCUMENTS

| | | |
|---|---|---|
| WO | 03/064970 A1 | 8/2003 |
| WO | 2011/144454 A1 | 11/2011 |

OTHER PUBLICATIONS

Office Action dated Mar. 6, 2018 issued in related co-pending Austrian Application No. GM9004/2016.
Extended European Search Report dated Oct. 2, 2018 issued in related co-pending European Application No. 16758401.0.
Wang Jianjun et al., "A Proposal to Compensate Platform Attitude Deviation's Impact on Laser Point Cloud From Airborne LiDAR", IEEE Transactions on Instrumentation and Measurement, IEEE Service Center, Sep. 1, 2013, pp. 2549-2558, vol. 62, No. 9, Piscataway, NJ.
Xiangrui Tian et al., "Design on the aerial survey parameters of the airborne LiDAR", RSETE, 2011 International Conference on IEEE, Jun. 24, 2011, pp. 214-217, Beihang University, Beijing, P.R. China.

* cited by examiner

LASER SCANNING APPARATUS AND METHOD

TECHNICAL FIELD

Embodiments of the invention are directed, in general, to providing an improved apparatus and method for 3-D measurement of land topography from an airborne or ground-based platform and, in particular, one that eliminates the potential loss of data that can be caused by blind zones which can occur in existing laser terrain mapping systems.

BACKGROUND

Airborne Laser Terrain Mapping (ALTM) systems use a Time-of-Flight (TOF) LiDAR to measure the distance from a system mounted in an aircraft, to the ground beneath the aircraft. A short pulse of visible or infra-red light is emitted by a light source such as a laser, and directed towards a target. The light pulse propagates to the target and a fraction is reflected and travels back to the LiDAR system where it is detected by a high-speed optical detector such as an avalanche photodiode, which converts the light pulse to an electrical signal which is then amplified. By measuring the time interval from the instant the light pulse was emitted to when the return signal was received, the distance to the target can be calculated using the accurately-known speed of propagation of the light pulse. The TOF can be measured by an electronic subsystem such as a Time Interval Meter, by digitizing the echo received and analyzing the waveform, or other means.

When the laser is fired, there is a very brief period when the detector might see some scattered light. This could be caused by reflections from internal optical components, a window at the output of the system, a window in the aircraft through which the system operates or backscattering from the first few meters of the air below the aircraft. If the echo from a previously-emitted laser pulse were to arrive at the detector during this brief period, it would not be distinguishable from the scattered light pulse and if the scattered light produced a signal of much higher amplitude than the return pulse from the target, it would swamp the echo and render the system blinded for a period of time. The pulse from the unwanted scattered light causes a blind zone during which the system is not able to respond to the return signal and measure the TOF. Consequently no range data can be computed and essentially the laser shot is wasted. Currently, all existing airborne laser mapping systems have this limitation.

For an ALTM operating at a high pulse repetition frequency (PRF), the range to the target could be such that the TOF is many times the time interval between two successive firings of the laser. Firing the laser before the return pulse from the target is received results in more than one pulse in the air at the same time. If for example the target range and laser PRF were such that there were five pulses in the air at the same time, there could be five blind zones which would significantly increase the possibility of the echo being masked and reducing the possibility of obtaining a valid range measurement. Planning the flight altitude to minimize the impact of blind zones is virtually impossible at high laser PRFs because the TOF changes with aircraft height above ground, the scanner excursion angle, the aircraft roll, pitch or heading as well as the topography of the terrain itself.

SUMMARY OF THE INVENTION

In general, the disclosed embodiments relate to the challenge of dealing with multiple pulses of light that are in transit to and from the target at the same time. The goal is to prevent the outgoing and incoming pulses from being incident on the detector at the same instant, which would make the system "blind" to incoming return pulses.

Accordingly, the disclosed embodiments include a system or apparatus and one or more methods for eliminating the negative effect of blind zones and enables operation of the system at high laser PRFs without loss of data. Consequently, the disclosed embodiments have the potential to collect valid data at the full laser PRF.

In addition to blind zones caused by the unwanted scattered light described above, under certain atmospheric conditions, blind zones can also be caused when the system detects backscattered light from the first few meters of the air below the aircraft. For instance, the return signal could be from humid air 10 m below the aircraft, or it could be a ground return pulse from ten laser shots ago, that is finally arriving at the detector. Thus, certain embodiments disclosed herein are configured to significantly reduce the probability of this occurring and extending the blind zone. For example, certain embodiments may include special optical elements and a scanner that prevents the detection of unwanted return pulses from the first few meters of the atmosphere. Without the optical elements, the system would be swamped by non-desired signals. In one embodiment, the disclosed system will reduce or eliminate blind zones caused by backscattered light within 20-50 m below the aircraft.

As will be further described, in certain embodiments, advantages of the disclosed embodiments are accomplished using an electronic circuit that captures the time interval between the emitted light pulse and subsequent optical signals that are incident on the detector above a certain threshold. These signals could be a result of a) the backscattered light from the outgoing light pulse by optical surfaces, b) the back-scattered light from the outgoing light pulse by the atmosphere close to the aircraft, or c) a return pulse from the intended target. In certain situations, no return pulses are received (e.g., altitude too high, hazy atmosphere, target reflectance too low); whereas, at other times, multiple return pulses may be received from a single laser pulse (from a wire, or top of a tree, or branches beneath, or from the ground). In accordance with the disclosed embodiments, every one of these detected events results in a TOF measurement. In certain embodiments, this is achieved through a hardware solution.

In one embodiment, the detected signals are monitored in real time and the resultant range to the ground is computed. An algorithm identifies and differentiates outgoing signals from return pulses. A signal resulting from the scattering of the output pulse by the internal optical components or windows is identified as such by virtue of the time at which it occurs. Said time being synchronous with the time of emission of the laser pulse. For each return pulse, as will be described below, an algorithm checks for the potential of an outgoing and incoming signal to be incident on the detector at the same instant, the occurrence of which is referred herein as a collision. The time span in which this collision may occur is referred to as a blind zone. If it is predicted that this will occur, the system makes a very tiny adjustment (e.g., a fraction of a millionth of a second) to the time of sending out the next laser shot (the outgoing signal) in order to prevent the collision from occurring, and thus eliminating the blind zone. In effect, the firing of the laser is either delayed or advanced so that the outgoing laser pulse is placed into a time period where the return signal is not expected to be incident on the detector. The results are continuously monitored and adjusted as required. In one embodiment, this is done shot-by-shot at the laser firing rate which can be over half a million shots per second.

Another advantage of the disclosed embodiments includes an apparatus and method for maintaining a constant swath width and point distribution on the ground, independent of the altitude of the aircraft or the elevation of the ground terrain.

As an example embodiment, the disclosed apparatus may include a processor for executing computer-executable instructions and a computer-readable storage media for storing the computer-executable instructions. These instructions when executed by the processor enable the apparatus to perform features including dynamically monitoring the time of flight (TOF) of laser light pulses transmitted and received by the laser scanning apparatus; determining whether there is a potential for the outgoing laser light pulse and an incoming signal to be detected within a few nanoseconds of each other; and adjusting a pulse repetition frequency (PRF) in response to a determination that the potential simultaneous (within a few nanoseconds) detection of the outgoing laser light and the incoming signal is likely to occur. Other instructions may include dynamically adjusting the scanner parameters to keep a spot density relatively constant as at least one of an aircraft flying height and ground terrain elevation changes during a survey mission for maintaining a constant swath width using a laser scanning apparatus.

One example of the various embodiments disclosed herein include a system that is adapted to be mounted on an airborne platform for the measurement of topographic elevations, wherein the system includes a pulsed laser for generating a pulse of light; a primary mirror adapted to oscillate back and forth in at least one axis so as to direct the laser light to the ground in a pattern and further adapted to receive reflections of the laser light from the ground and direct the reflections of the laser light to a secondary mirror, the secondary mirror adapted to reposition and maintain the received laser light onto the center of a detector, the detector configured to produce an electrical signal that is amplified by a receiver; a time interval meter configured to determine the time of flight of the received laser light; and control electronics configured to determine the measurement of topographic elevations beneath the airborne platform using the time of flight of the received laser light. In one embodiment, the secondary mirror is located between the primary mirror and a re-imaging module.

Other embodiments and advantages of the disclosed systems and methods are further described in detail below.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION

Figure 1:
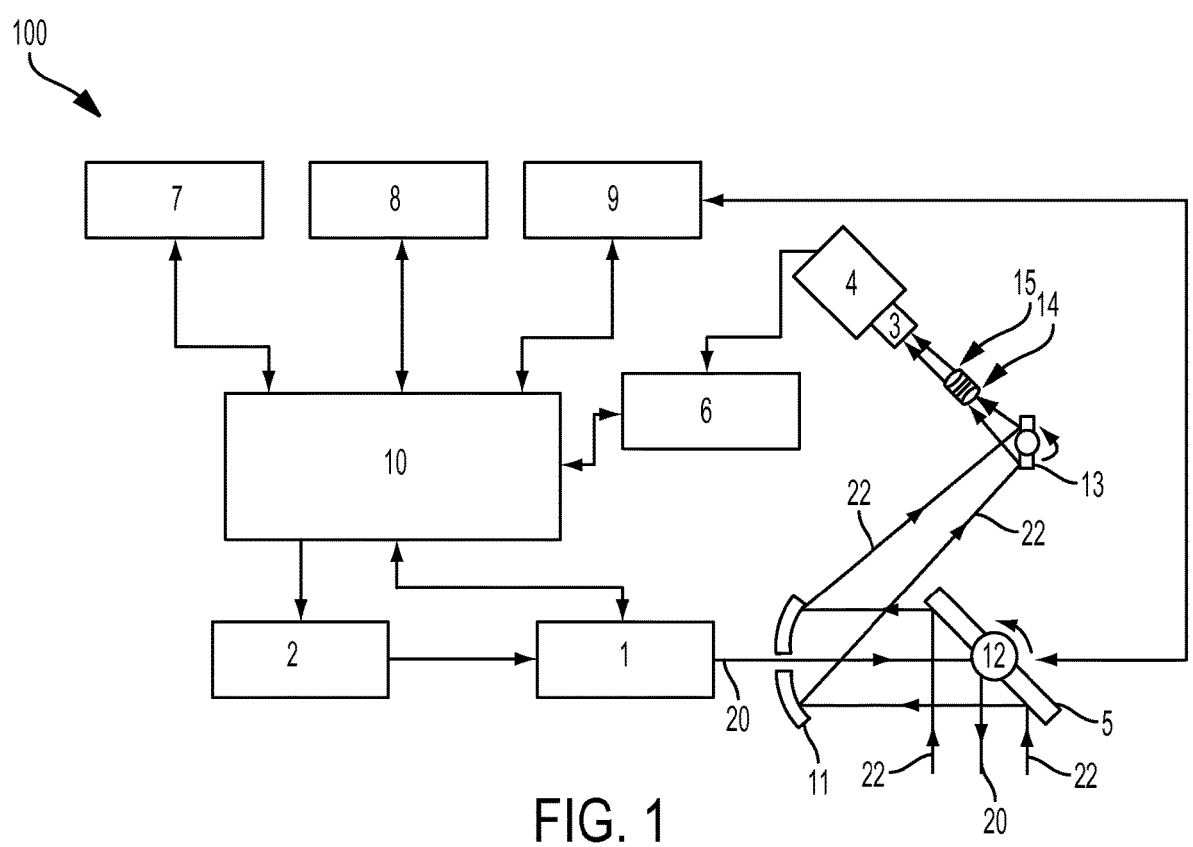
FIG. 1 is a block diagram illustrating a system in accordance with one embodiment.

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. For instance, although certain embodiments described herein focuses on an airborne application of the invention, other embodiments of the invention can include ground-based laser scanning applications, using either mobile or static platforms.

Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

In addition, in the description which follows the drawing figures are not necessarily to scale and certain features may be shown in generalized or schematic form in the interest of clarity and conciseness or for informational purposes, and do not limit the scope of the claims.

Additionally, although specific terms are employed herein, they are used in a generic and descriptive sense only and not for purposes of limitation. For instance, the term computer, as used herein, is intended to include the necessary electronic components such as, but not limited to, memory and processing components that are configured to enable the execution of programmed instructions.

As described herein, the disclosed embodiments include an improved laser scanning apparatus and method that are configured to prevent loss of data caused by blind zones. For example, in one embodiment, based on the TOF measurement from the previous laser shot, or a sequence of previous laser shots, the apparatus includes a data acquisition computer or other electronics that predicts whether the return signal from the next laser shot is likely to fall into a blind zone if operation is continued at the current laser PRF. If the apparatus determines that the return signal from the next laser shot is likely to fall into a blind zone if operation is continued at the current laser PRF, the apparatus is configured to either advance or delay the laser firing time to ensure that the return signal will be clear of the blind zone. In some embodiments, the adjustment process is performed on a shot by shot basis while maintaining the average data collection rate that was planned for the mission.

In one embodiment, to reduce the potential for backscattered atmospheric returns, the apparatus is configured to reduce the laser power to no more than what is needed for reliably obtaining range measurements at the chosen flying height. The apparatus is also configured to control a small mirror which controls the receiver pointing direction. One advantage of this additional mirror configuration and control process is that it reduces the required receiver field of view (FOV), while still being able to optimize the collection of the received signal. For instance, the scan rate is typically a few thousand degrees per second. For long-range targets, by the time the return signal is received the scanner mirror moves an appreciable amount. Consequently to enable detection at both short range and long range a wider receiver FOV than the optimum is required. As disclosed herein, with the use of a small mirror under computer control, it is possible to adjust the receiver alignment with respect to the transmitter as a function of the scan rate and range to the target. This allows a smaller optimized receiver field of view.

Beginning with FIG. 1, a block diagram is presented that depicts one example configuration of a topographic imaging lidar system 100 in accordance with the disclosed embodiments. In this particular embodiment, the system 100 comprises a pulsed laser 1 with an attached collimator for producing a low-divergence beam. An example of such a laser is a fiber laser that can produce pulse energies of tens of micro joules in a 2 nanosecond wide pulse at pulse repetition frequencies of hundreds of kHz and having a beam divergence less than a milliradian. The pulsed laser 1 is externally triggered from a pulse generator 2 and produces a short optical pulse 20 which is directed onto a primary oscillating scanner mirror 5 driven by a galvanometer scanner motor 12. An optical scanner comprising the primary oscillating scanner mirror 5, galvanometer scanner motor 12, and scanner drive electronics 9 simultaneously deflects the outgoing transmit pulse 20 and the received return pulse(s) 22 from a target. Different scan patterns can be used (such as saw-tooth, sinusoidal, etc.) to obtain sample data points of the terrain that is being imaged.

A small fraction of the transmitted pulse energy is reflected by the terrain and then reflected by the primary oscillating scanner mirror 5 onto an off-axis parabolic mirror 11 and onto a secondary scanner mirror 13 before passing through a re-imaging module 15 containing lenses and spectral filter 14, and onto a detector 3, which produces an electrical signal that is amplified by a receiver electronics 4. The TOF is measured by a time interval meter 6.

In the depicted embodiment, the system includes a position and orientation component 7 that includes global positioning system (GPS) positioning and inertial systems that are used for direct geo-referencing the location of the laser point on the terrain. A control and data acquisition computer 10 (that includes electronics, one or more processors, and memory components for storing and executing instructions and non-volatile memory for storing data produced by the system) controls the operation of the system 100. For example, in one embodiment, when the laser is fired, the control and data acquisition computer 10 collects the measured data, which includes the TOF, scan angle, sensor position (e.g., latitude, longitude, height above ellipsoid, etc.) and orientation (e.g., roll, pitch, heading, etc.). The control and data acquisition computer 10 is configured to time-stamps each piece of data and save it in a data storage unit such as, but not limited to, solid state disk drives. In one embodiment, the system 100 may include an external, wired or wireless, interface such as an operator interface 8 that enables the system 100 to communicate with an external device. For example, in one embodiment, the control and data acquisition computer 10 may receive programming instructions and/or other data from a laptop computer for setting system parameters and monitoring performance. In certain embodiments, the system 100 may be configured to communicate over one or more public or private networks (e.g., the Internet, an intranet, mobile data network, etc.) for sending or receiving programming instructions and/or other data to and from the system 100. In some embodiments, the control and data acquisition computer 10 is configured to also run the mission planning software, which provides the ability to plan the mission by graphically selecting the survey area on an imported map, view the flight lines that are needed to cover the survey area at the chosen flying height and monitor the actual coverage and system status in real-time.

As shown in FIG. 1, in certain embodiments, the system includes a secondary scanner mirror 13 for implementing a method for reducing the probability of detecting atmospheric backscatter. For instance, in current systems, after the transmitted laser pulse (depicted by transmit beam 20) is reflected off the primary oscillating scanner mirror 5 towards the target, if the range to the target is large and the scan rate high, the primary oscillating scanner mirror 5 rotates through an appreciable angle by the time the return pulse (depicted by received beam 22) returns to the primary oscillating scanner mirror 5. Without the secondary scanner mirror 13, the received light spot will move back and forth across the surface of the detector 3 as the primary oscillating scanner mirror 5 oscillates back and forth. Thus, in current systems, where the size of the detector 3 determines the receiver FOV, a relatively large detector and hence a large receiver FOV is required. However, the result will be a less than optimum signal-to-noise ratio.

Thus, in accordance with the disclosed embodiments, the secondary scanner mirror 13 is used to keep the received light spot on the center of the detector 3, so a smaller receiver FOV can be used. In one embodiment, the secondary scanner mirror 13 is synchronized to, and driven at the same scan rate as the primary oscillating scanner mirror 5. Because backscattered pulses from the atmosphere are more prevalent at close range, these undesirable backscattered pulses will fall on the edge of the detector 3 and hence will be greatly attenuated.

In one embodiment, to further reduce the potential for backscattered atmospheric returns, the apparatus is configured to operate with a reduced laser power, no more than what is needed for reliably obtaining range measurements at the chosen flying height. In one embodiment, the minimum laser power needed for reliably obtaining range measurements at the chosen flying height may be determined by executing an algorithm that performs a lookup in a table containing minimum power laser levels versus flying height. In some embodiments, this process is executed continuously in real time to adjust the laser power as the flying height or terrain changes. The advantage of reducing the laser power to no more than what is needed for reliably obtaining range measurements is to reduce the amplitude of unwanted backscattered signals from internal reflections and the atmosphere. Signals below the receiver detection threshold will not produce an output from the receiver and hence will not cause a blind zone.

A second advantage of the disclosed embodiments is that for long-range targets where maximum laser power is required, the secondary scanner mirror is positioned (rotated) with an offset with respect to the primary scanner mirror, so that by the time the echo is received (after the TOF delay), the primary scanner has rotated so that the receiver FOV pointing direction will be in the optimum position to detect the long-range echo, but will be misaligned for short-range atmospheric returns. Thus, the probability of detecting atmospheric returns is reduced or eliminated.

As an example, suppose the primary oscillating scanner mirror 5 rotates the beams at a rate of 4000 degrees/second, the target range is 3500 meters and the receiver FOV is 1 milliradian. The TOF for the 2-way transit of the optical pulse will be approximately 23.4 microseconds. Thus, the scanner will have rotated the beam approximately 1.6 mrad by the time the echo is received. Consequently, with the secondary scanner mirror 13 operating as described above, the receiver FOV will be misaligned by 1.6 mrad for close-range targets resulting in significant attenuation of return signals from close-range targets, thereby, reducing or eliminating blind zones caused by backscattered pulses from the atmosphere.

Figure 2:
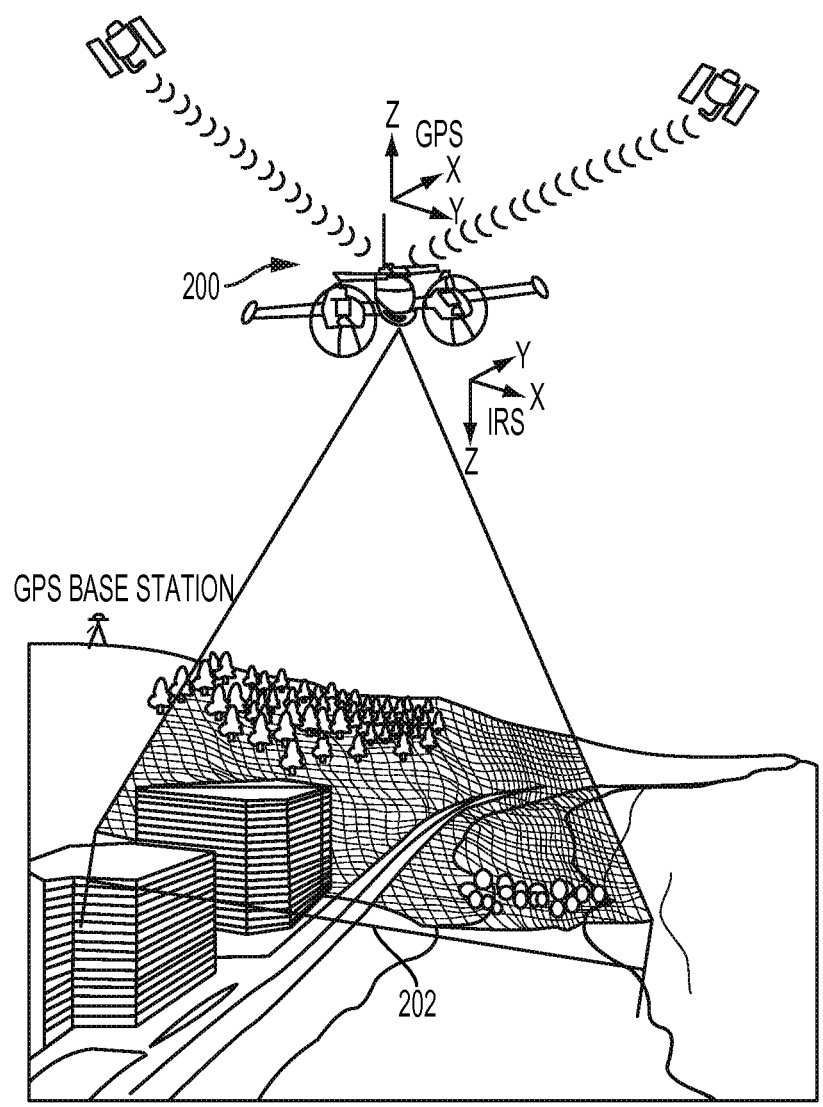
FIG. 2 is a schematic view of the system in operation.

FIG. 2 shows the system 100 in operation. The system 100 is mounted in or on an airborne platform such as, but not limited to, an airplane 200. Using a pulsed laser, the system 100 generates a swath 202 produced by an across-flight optical scanner and the forward motion of the aircraft results in coverage along a track. As stated above, the system 100 uses GPS and IMU (inertial measurement unit) positioning for direct geo-referencing the location of the laser point on the terrain.

Figure 3:
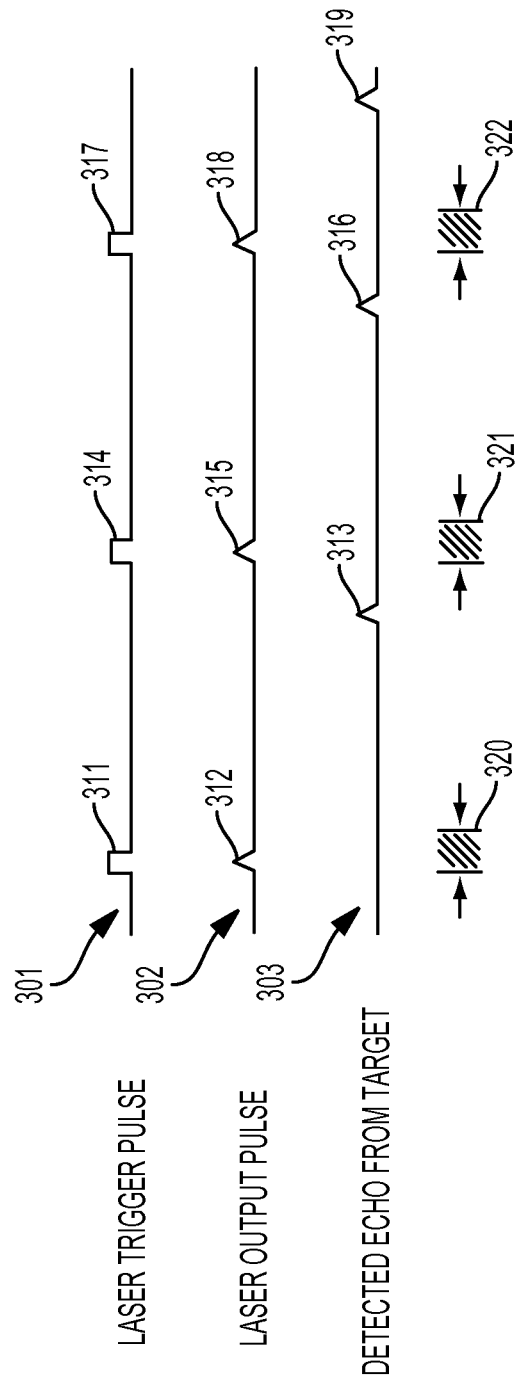
FIG. 3 is an example of a timing diagram illustrating the case where there is only one pulse in transit at any given time in accordance with the disclosed embodiments.

FIG. 3 is an example of a timing diagram showing a sequence 301 that includes three sequential laser trigger pulses and a corresponding sequence 302 of laser output pulses for the case where there is only one optical pulse in transit at any time. In the depicted embodiment, trigger pulse 311 produces laser output pulse 312, trigger pulse 314 produces laser output pulse 315, and trigger pulse 317 produces output pulse 318. Sequence 303 illustrates the received return pulses from the target resulting from the laser output pulses. For instance, echo pulse 313 is the result of laser output pulse 312, echo pulse 316 is the result of laser pulse 315, and echo pulse 319 is the result of laser output pulse 318. The corresponding blind zones (i.e., the time in which the system is blind to incoming signals) are shown as 320, 321 and 322. In a typical system, the width of the laser pulse is 2 or 3 nanoseconds, while the blind zone can extend for tens of nanoseconds, or more.

Figure 4:
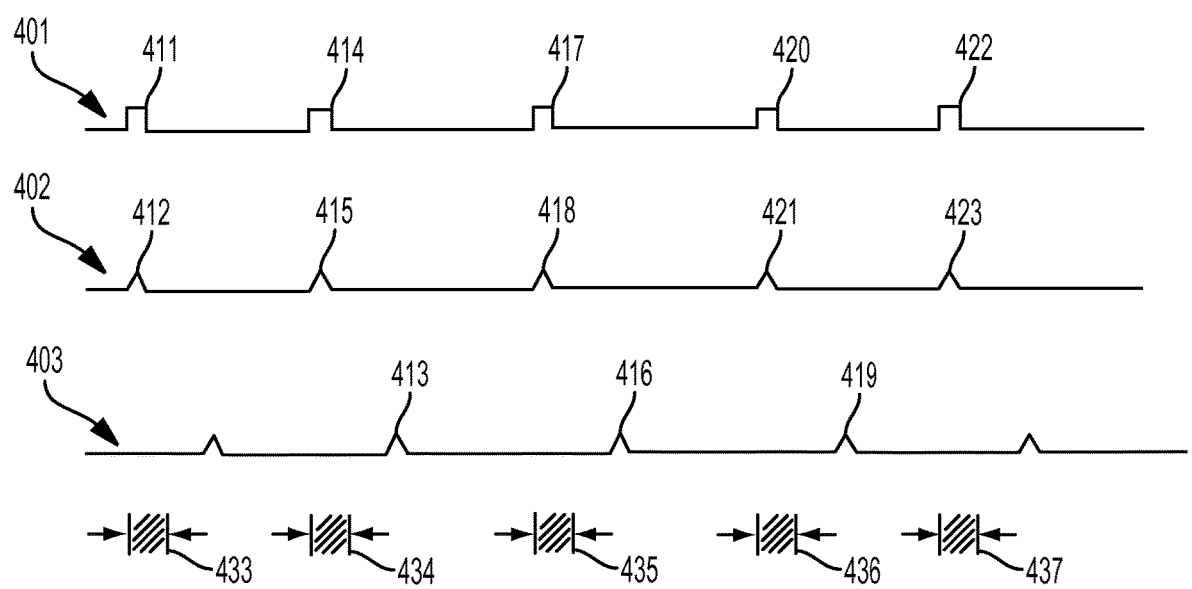
FIG. 4 is an example of a timing diagram illustrating the case where there are two optical pulses in transit at the same time in accordance with the disclosed embodiments.

FIG. 4 is an example of a timing diagram showing a sequence 401 depicting five sequential laser trigger pulses to the laser and a corresponding sequence 402 of laser output pulses for the case where the laser is triggered before the echo (shown in sequence 403) from the previous pulse has been received. Consequently, under this scenario, there are two optical pulses in the air at the same time. For instance, in the depicted embodiment, trigger pulse 411 produces laser output pulse 412, trigger pulse 414 produces laser output pulse 415, trigger pulse 417 produces output pulse 418, trigger pulse 420 produces output pulse 421, and trigger pulse 422 produces output pulse 423. Return pulse 413 is the result of laser pulse 412, return pulse 416 is the result of laser pulse 415, return pulse 419 is the result of laser pulse 418, etc. As stated above, because the laser is triggered before the return pulse from the previous pulse has been received, return pulse 413 is the result of laser pulse 412 and not laser pulse 415, and return pulse 416 is the result of laser output pulse 415, and not output pulse 418. In the depicted embodiment, the corresponding blind zones are shown as 433, 434, 435, 436, and 437. If there are more pulses in transit at the same time, the number of blind zones increases although the length of the blind zone is unchanged. As a result, the number of potentially wasted laser shots is increased.

Figure 5:
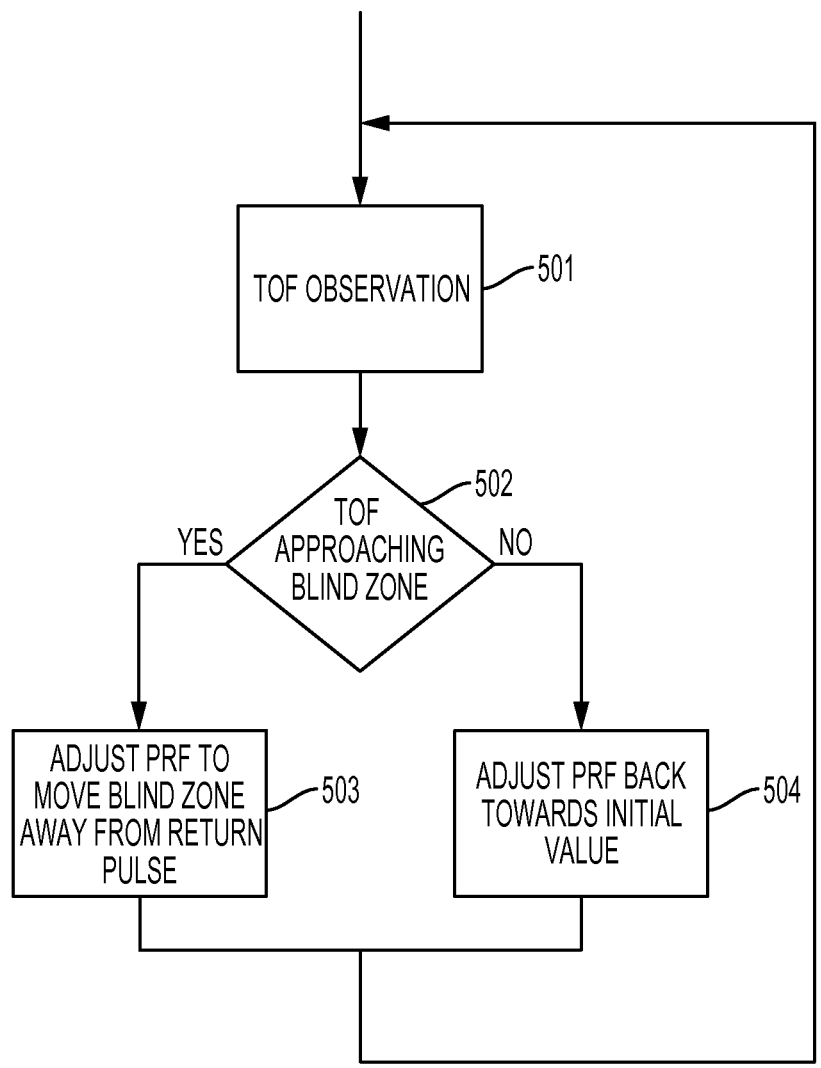
FIG. 5 is a flow chart illustrating a method of changing the laser firing time to avoid potential blind zones in accordance with one embodiment.

Referring now to FIG. 5, a flow chart illustrating one example of a method of changing the laser firing time to avoid potential blind zones is presented in accordance with the disclosed embodiments.

The laser is operated at a nominal PRF which is selected to provide the required density of laser spots on the ground. In addition to the laser PRF, the spot density depends on the scan angle minimum to maximum range, the scanner speed, the aircraft speed over ground and the flying height above ground. For each laser shot, the TOF will be the 2-way range to the target (there and back) times the speed of light. This TOF (which is accurately measured) determines when the return pulse is received from the target, relative to the time of emission of the pulse from the laser.

Since the laser is externally triggered and since the laser emission occurs at a fixed repeatable time after the laser trigger is applied, the time T between the optical outputs of successive laser shots (where T is the reciprocal of the PRF at that instant) is known. Hence the times at which the blind zones occur are also known and can be controlled by changing the laser trigger time. Specifically, on a shot to shot basis, T can be increased or decreased slightly to ensure that a blind zone is not coincident in time with the instant the return pulse is received. These changes in T are equivalent to small changes in the laser PRF which do not significantly change the laser spot position on the ground or the spot density.

As an example, if the laser is firing at a PRF of 200 kHz, there will be blind zones every 5 microseconds which may extend (for example) for 10 nanoseconds. If the range to the target is 740 meters, the TOF will be approximately 4.938 microseconds. In this example the echo will be received 62 nanoseconds before the blind zone. The preceding sequence of TOF measurements may indicate that, for whatever reason (terrain variation, aircraft position or orientation change, scan angle change, etc.), there is a high probability that the echo from the next laser shot will fall into the blind zone if an adjustment to the PRF is not made. The software algorithm that controls the laser firing time might then shift the blind zone by reducing T by an amount of 100 nanoseconds (increase the PRF slightly) so that the echo now occurs after the blind zone, or the algorithm might increase T (reduce the PRF slightly) so that the return pulse occurs well before the blind zone. These decisions are based on knowledge from the preceding TOF measurements.

The process or algorithm is implemented as computer executable instructions and is executed using one or more processor of the disclosed systems. The process begins at step 501 by monitoring in real-time the reported TOF (time of flight) of each laser output pulse. This is determined based on the time the laser output pulse is generated to the time the corresponding return pulse is received by the system. In this embodiment, the sequence of TOF measurements are analyzed at step 502, to predict if an upcoming TOF will be near a blind zone. In certain embodiments, the PRF may be adjusted based on user preference or based on other parameters such as, but not limited to, flight data, type of terrain, etc.

At step 503, if the process determines that an upcoming TOF will be near a blind zone, the PRF is adjusted (up or down), to avoid this occurrence. In one embodiment, if the return pulse comes less than 30 nanoseconds before a blind zone, the next laser trigger pulse is advanced by 50 nanoseconds (increase the PRF slightly) to make the blind zone occur before the expected time of arrival of the return pulse, or to delay the laser trigger pulse by 40 nanoseconds (decrease the PRF slightly) to make the blind zone occur an additional 40 nanoseconds after the expected time of arrival of the return pulse.

If no adjustment to the PRF has been made to avoid a blind zone, the process at step 504 will make an adjustment to the PRF to make it closer to the initial PRF setting that was programmed for the survey mission to achieve the desired spot spacing and density.

In some embodiments, the adjustment may be performed by adding or subtracting a constant value. Alternatively, in other embodiments, the adjustment may be performed by adding or subtracting a dynamic range of values based on the determined upcoming TOF. In one embodiment, the system will make as minimum an adjustment as needed to cause the upcoming TOF to not be near a blind zone.

Although the depicted embodiment monitors TOF measurements in time sequence, in alternative embodiments, the process can be extended to extrapolate by referencing past laser shots as a function of scanner position or calculated 3D position of the point.

Still in some embodiments, the system may be configured to dynamically adjust the minimum to maximum scan angle coverage so as to compensate for the changing height of the aircraft and the changing elevation of the ground terrain to provide for a constant swath width and laser spot distribution on the ground. In one embodiment, this is made possible by the use of a programmable galvanometer-based scanner. The programmable galvanometer-based scanner is configured to execute a swath-tracking algorithm for the purpose of maintaining the desired laser spot density on the ground. In systems without swath-tracking, the swath width is a function of the programmed scan angle and flying height above ground. Consequently, in varying terrain heights, the spot density will not be constant. In accordance with the disclosed embodiments, by dynamically adjusting the scanner parameters (e.g., the minimum to maximum scan angle coverage), the system is able to keep the spot density relatively constant as the terrain height changes during the survey mission.

Additionally, in certain embodiments, the system may also be configured to compensate for changes in aircraft flying height and roll angle. For example, in one embodiment, using inputs from the GPS receiver and inertial measurement unit, the position and orientation component 7, as described in FIG. 1, is configured to compute the aircraft roll angle in real-time. Since the rotation axis of the primary oscillating scanner mirror 5 is parallel to the aircraft's roll axis, the control and data acquisition computer 10 is able to program the primary oscillating scanner mirror 5 to compensate for the aircraft roll by offsetting the swath accordingly. Thus, this adjustment keeps the swath symmetrically centered below the aircraft. The control and data acquisition computer 10 also monitors the TOF data for every laser shot as measured by the Time Interval Meter 6, and calculates the slant range to the terrain. Using the calculated slant range to the terrain together with the measured scan angle associated with each laser shot, the system calculates the vertical elevation above the ground and a mean value is estimated, which is used to adjust the minimum to maximum scan angle coverage (swath).

In another embodiment the median difference of the aircraft to ground distance is used adjust the swath width.

In yet another embodiment, when mapping sloping terrain, the extent of the swath on the ground below the left side of the aircraft can be made different from the extent of the swath on the ground below right side of the aircraft.

As an example of swath-tracking, suppose a planned survey calls for a maximum scan angle of 20 degrees at a flying height of 1000 meters above ground, if the distance from the aircraft to the ground changes to 2000 meters, either due to a change in terrain height or a change in the aircraft altitude, the system will dynamically reduce the maximum scan angle to 10 degrees in order to keep the swath width constant.

Thus, the disclosed embodiments provide system operators the benefit of swath-tracking. An advantage of this additional feature includes not having to plan for wider than necessary swath widths to cover the possibility of aircraft to ground distance changes, which results in cost savings.

Accordingly, the disclosed embodiments provide one or more technical solutions to the problems associated with current airborne laser scanning systems. For example, in one embodiment, the disclosed embodiments provide an improved airborne laser scanning system that eliminates or reduces blind zones caused by unwanted scattered light (e.g., caused by reflections from internal optical components, a window at the output of the system, a window in the aircraft through which the system operates, etc.) and backscattered light from the first few meters of the air below the aircraft. Additionally, as described above, the disclosed embodiments provide an improved airborne laser scanning system capable of maintaining a constant swath width.

Although representative processes and articles have been described in detail herein, those skilled in the art will recognize that various substitutions and modifications may be made without departing from the scope of what is described and defined by the appended claims. For instance, although the above description describes particular steps and functions being performed in a certain order and by particular modules, the features disclosed herein are not intended to be limited to any particular order or any particular implementation constraint. For example, one or more components may be added, repositioned, removed, and/or combined in the embodiment described in FIG. 1 without departing from the scope of the disclosed embodiments. As another example, in certain embodiments, the process described in FIG. 5 may adjust the PRF without considering whether the PRF is at its nominal setting.

Therefore, it is to be understood that the invention is not to be limited to the specific embodiments disclosed. The scope of the claims is intended to broadly cover the disclosed embodiments and any such modification or combinations as disclosed herein.

What is claimed is:

1. A machine-implemented method for maintaining a constant swath width using a laser scanning apparatus, the method comprising:
   dynamically adjusting scanner parameters by the laser scanning apparatus to keep a spot density and a swath width relatively constant as at least one of an aircraft flying height and ground terrain elevation changes during a survey.

2. The method of claim 1, wherein the scanner parameters includes scanner excursion angle.

3. The method of claim 1, wherein dynamically adjusting the scanner parameters includes compensating for a roll angle of a flying platform on which the laser scanning apparatus is mounted.

4. The method of claim 1, including adjusting the minimum and maximum scan angle coverage to maintain a constant swath width and a desired constant laser spot density on the ground terrain.

5. The method of claim 1, wherein the step of dynamically adjusting the scanner parameters to keep a spot density relatively constant as ground terrain elevation changes during a survey mission.

6. The method of claim 1, further comprising changing by the laser scanning apparatus a scan angle to keep the swath width and spot density relatively constant as the terrain height or aircraft altitude changes.

7. The method of claim 1, further comprising:
   predicting whether a return signal from a next laser shot by the laser scanning apparatus is likely to fall into a blind zone at a current pulse repetition frequency (PRF), and either advancing or delaying timing of the next laser shot so that a return signal will be clear of the blind zone.

8. The method of claim 7, wherein the advancing or delaying maintains an average data collection rate as planned for the survey.

9. The method of claim 1, wherein the laser scanning apparatus comprises a primary scanner mirror and a secondary scanner mirror, the secondary scanner mirror smaller than the primary mirror.

10. The method of claim 9, wherein the secondary mirror is driven at a same scan rate as the primary mirror.

11. The method of claim 1, further comprising:
reducing laser power of the laser scanning apparatus to reduce potential for backscattered atmospheric returns.

12. The method of claim 11, wherein the step of reducing laser power is executed in real time as the flying height or terrain changes.

13. The method of claim 11, wherein the step of reducing laser power is determined by performing a lookup in a table containing minimum power laser levels versus height.

14. A machine-implemented method for maintaining a constant swath width using a laser scanning apparatus, the method comprising:
dynamically adjusting scanner parameters by the laser scanning apparatus to keep a spot density and a swath width relatively constant as at least one of an aircraft flying height and ground terrain elevation changes during a survey, wherein the step of dynamically adjusting the scanner parameters includes keeping received light on a center of a detector relatively constant as at least one of an aircraft flying height and ground terrain elevation changes during the survey.

15. A machine-implemented method for maintaining a constant swath width using a laser scanning apparatus, the method comprising:
dynamically adjusting scanner parameters to keep a spot density relatively constant as at least one of an aircraft flying height and ground terrain elevation changes during a survey mission wherein at maximum laser power a secondary mirror is rotated with an offset with respect to a primary mirror for detecting long range echoes and for reducing detection of atmospheric returns.

16. A machine-implemented method for maintaining a constant swath width using a laser scanning apparatus, the method comprising:
dynamically adjusting scanner parameters by the laser scanning apparatus to keep a spot density and a swath width relatively constant as at least one of an aircraft flying height and ground terrain elevation changes during a survey; and
compensating by the laser scanning apparatus for a change in a roll angle to keep a swath symmetrically centered below a flying platform on which the laser scanning apparatus is mounted.

* * * * *